(12) United States Patent
Weihl

(10) Patent No.: US 11,589,522 B2
(45) Date of Patent: Feb. 28, 2023

(54) STAND-ON DEBRIS BLOWER AND DEFLECTOR ASSEMBLY FOR SAME

(71) Applicant: Briggs & Stratton, LLC, Wauwatosa, WI (US)

(72) Inventor: Rick A. Weihl, Muskegon, MI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 845 days.

(21) Appl. No.: 16/562,830

(22) Filed: Sep. 6, 2019

(65) Prior Publication Data

US 2020/0084978 A1    Mar. 19, 2020

Related U.S. Application Data

(60) Provisional application No. 62/744,842, filed on Oct. 12, 2018, provisional application No. 62/730,750, filed on Sep. 13, 2018.

(51) Int. Cl.

| | |
|---|---|
| *A01G 20/47* | (2018.01) |
| *F04D 25/06* | (2006.01) |
| *B08B 5/02* | (2006.01) |
| *B62D 51/00* | (2006.01) |
| *B62D 51/02* | (2006.01) |
| *B62D 51/04* | (2006.01) |

(52) U.S. Cl.
CPC ............... *A01G 20/47* (2018.02); *B08B 5/02* (2013.01); *B62D 51/001* (2013.01); *B62D 51/02* (2013.01); *B62D 51/04* (2013.01); *F04D 25/06* (2013.01)

(58) Field of Classification Search
CPC .................................. A01G 20/47; B08B 5/02
See application file for complete search history.

(56) References Cited

U.S. PATENT DOCUMENTS

| 4,227,280 A | 10/1980 | Comer |
| 6,073,305 A | 6/2000 | Hesskamp |
| 7,841,044 B1 | 11/2010 | Weihl et al. |
| 9,750,180 B2 | 9/2017 | Pearson |
| 2016/0120131 A1* | 5/2016 | Conrad ............... F04D 25/0673 15/319 |

* cited by examiner

*Primary Examiner* — Andrew A Horton
(74) *Attorney, Agent, or Firm* — Foley & Lardner LLP

(57) ABSTRACT

A stand-on debris blower comprising including a main frame, a pair of front wheels, and a pair of rear wheels. The stand-on debris blower also includes an operator standing platform coupled to the main frame, a control pedestal positioned forward of and above the operator standing platform, and a power source, wherein the power source has a vertically-oriented shaft. A blower assembly is also provided, wherein the blower assembly includes a horizontally-oriented impeller configured to rotate about a vertical axis, the horizontally-oriented impeller being coupled to the vertically-oriented shaft of the power source. Additionally, the blower assembly may include a V-shaped deflector assembly configurable to block air flow to at least a first, a second, or both a first and second discharge chute in the blower assembly.

20 Claims, 8 Drawing Sheets

STAND-ON DEBRIS BLOWER AND DEFLECTOR ASSEMBLY FOR SAME

CROSS-REFERENCE TO RELATED APPLICATIONS

This application claims priority to U.S. Provisional Patent Application No. 62/730,750, filed Sep. 13, 2018, and U.S. Provisional Patent Application No. 62/744,842, filed Oct. 12, 2018, the disclosures of which are incorporated herein by reference in their entirety.

BACKGROUND

The present disclosure relates generally to outdoor power equipment such as, e.g., stand-on, ride-on, and/or walk-behind debris blowers. More specifically, the present disclosure relates to stand-on debris blowers utilizing at least one vertical shaft power source and a horizontally-oriented blower assembly coupled to the vertical shaft power source, along with a multi-position deflector assembly capable of both diverting and impeding the flow of air through the blower assembly.

The use of debris blowers is prevalent for many yard and landscape maintenance tasks. Previously, most debris blowers were housed on a hand cart-style frame, requiring a user to manually push the cart to direct the blower. In other scenarios, a centrifugal fan blower unit was mounted to (or towed behind) a tractor or other large yard vehicle. However, the hand cart-style blowers were often not practical for use in large areas and/or across varied landscapes, while the blowers mounted to (or towed behind) larger vehicles generally lacked the maneuverability and ease of transport desired for removing debris in smaller areas.

More recently, stand-on debris blowers have gained favor with many landscape professionals and other users, as their powered, rideable design enables a user to cover larger areas and highly-varied terrain, while their overall maneuverability and relatively compact size also makes them suitable for smaller areas, such as residential yards. An example of such a stand-on debris blower is shown and described in U.S. Pat. No. 7,841,044 B1, the disclosure of which is incorporated herein by reference.

While stand-on debris blowers such as those shown and described in U.S. Pat. No. 7,841,044 B1 are advantageous in many scenarios, they have thus far been limited to use with horizontally-oriented power sources (e.g., horizontal-shaft, V-twin internal combustion engines), thereby effecting the options for blower configuration and placement, as well as the overall cost and size of the equipment unit. Furthermore, in blower assemblies having multiple side discharge chutes (e.g., right-, left-, and/or front-directed chutes), the operator must control the operation and position of two or more deflector assemblies within the blower assembly in the event that the operator wishes to completely impede the flow of air from the blower assembly. That is, in the case of a blower assembly having a right- and a left-directed side discharge chute, the operator must individually control (via, e.g., two or more control levers) respective deflector assemblies associated with each respective chute in order to close off the flow of air from the blower assembly during, e.g., machine transport. The need to control the position of multiple deflector assemblies individually may be time-consuming to the operator, and may lead to unwanted or unintentional opening/closing of side discharge chutes before achieving the desired positioning of the various deflector assemblies.

This patent document described devices and/or configurations that are intended to address the issues discussed above and/or other issues.

SUMMARY

In accordance with an aspect of the disclosure, a stand-on debris blower is disclosed. The stand-on debris blower may include a main frame, a pair of front wheels, and a pair of rear wheels. The stand-on debris blower may also include an operator standing platform coupled to the main frame, and a control pedestal positioned forward of and above the operator standing platform. Additionally, a power source may be provided, wherein the power source comprises a vertically-oriented shaft. The stand-on debris blower may further include a blower assembly, wherein the blower assembly comprises a horizontally-oriented impeller configured to rotate about a vertical axis, the horizontally-oriented impeller being coupled to the vertically-oriented shaft of the power source.

According to another aspect of the disclosure, a debris blower is disclosed. The debris blower may include a power source, wherein the power source comprises a vertically-oriented shaft. A blower assembly may also be provided, wherein the blower assembly comprises a horizontally-oriented impeller configured to rotate about a vertical axis, the horizontally-oriented impeller being coupled to the vertically-oriented shaft of the power source.

In accordance with another aspect of the disclosure, a blower assembly for use with a debris blower unit is disclosed. The blower assembly may include a blower housing, an annular channel formed within the blower housing, and an impeller rotatable within the blower housing and configured to force a stream of air through the annular channel. The blower assembly may also include a first side discharge chute and a second side discharge chute. A V-shaped deflector assembly may be provided, wherein the V-shaped deflector assembly is positioned within the blower housing proximate the first side discharge chute.

DETAILED DESCRIPTION

The following description is made for the purpose of illustrating the general principles of the present system and method and is not meant to limit the inventive concepts claimed in this document. Further, particular features described in this document can be used in combination with other described features in each of the various possible combinations and permutations.

Unless otherwise specifically defined in this document, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to". Additionally, use the term "couple", "coupled", or "coupled to" may imply that two or more elements may be directly connected or may be indirectly coupled through one or more intervening elements.

Figure 1:
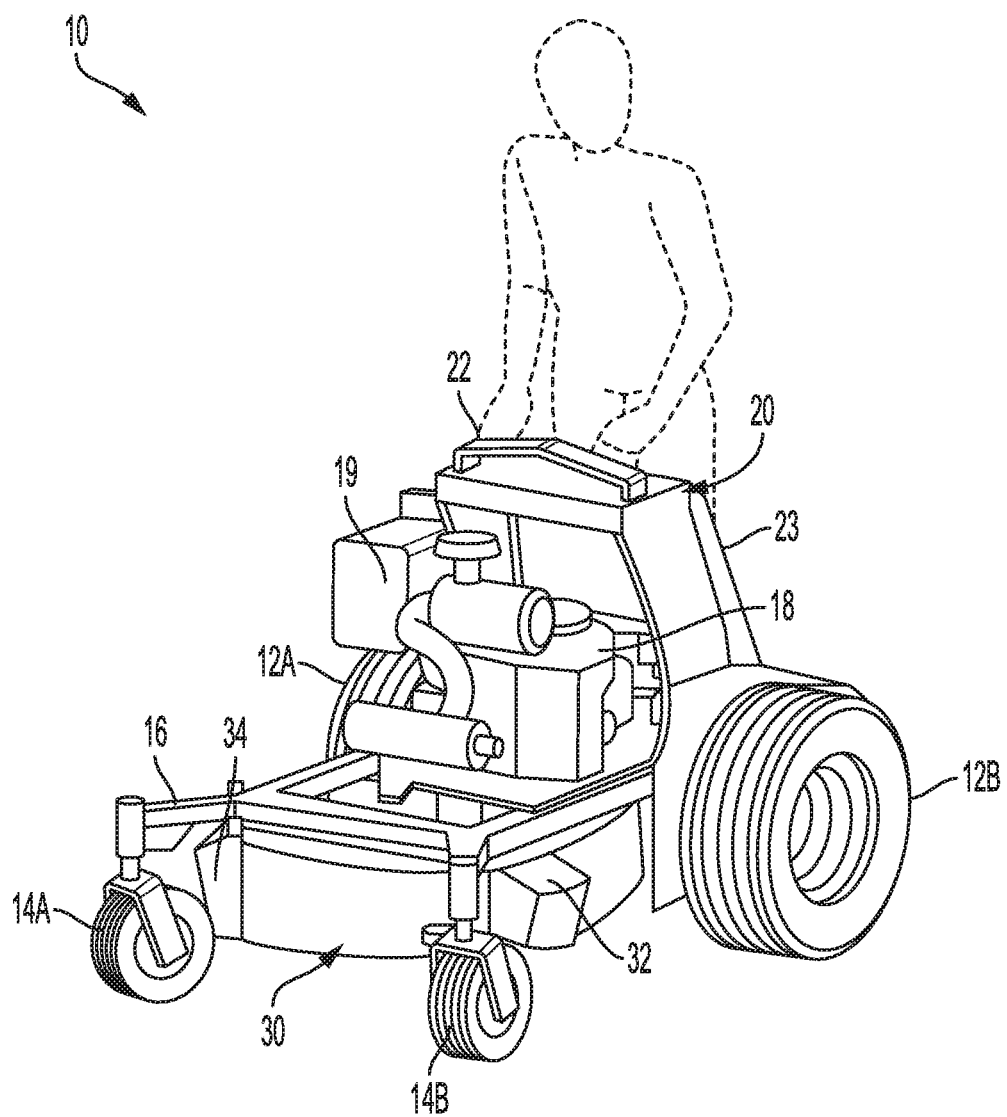
FIG. 1 is a front perspective view of a stand-on debris blower in accordance an aspect of the disclosure.
Figure 2:
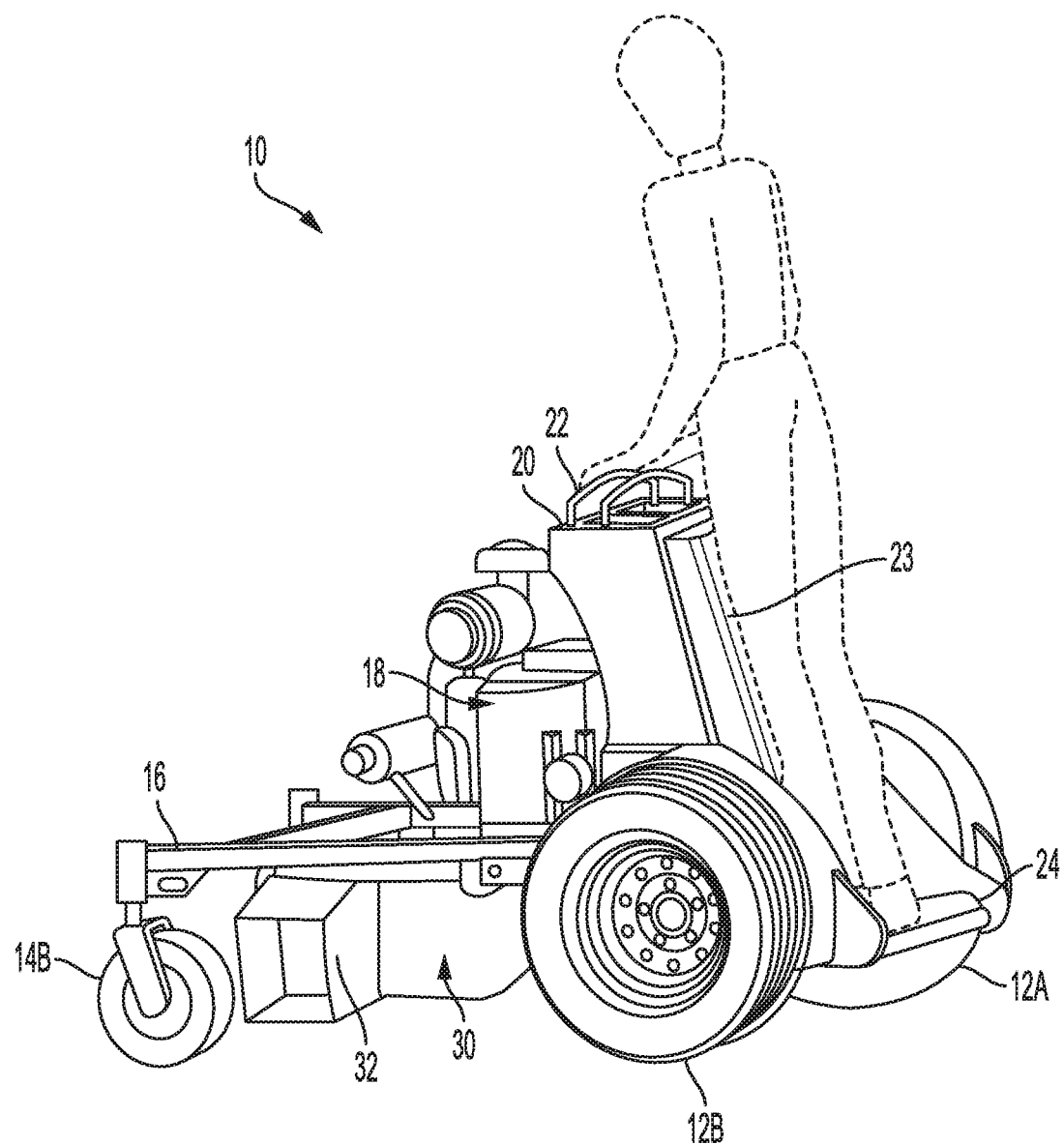
FIG. 2 is a side perspective view of the stand-on debris blower of FIG. 1.

Referring to FIGS. 1-2, outdoor power equipment in the form of a stand-on debris blower 10 is shown. For the sake of clarity, some components and/or features typically associated with stand-on outdoor power equipment have been omitted from FIGS. 1-2, including detailed user controls, power source/implement interfaces, etc. However, one of ordinary skill in the art will readily recognize that these components may be incorporated into stand-on debris blower 10 in accordance with the embodiments described in this document.

Stand-on debris blower 10 includes a pair of rear wheels 12A, 12B and a pair of front wheels 14A, 14B. In some embodiments, the pair of rear wheels 12A, 12B may be configured as independently drivable wheels, driven in both forward and reverse directions by, e.g., hydraulic wheel pumps/motors (not shown) coupled to a power source such as, e.g., internal combustion engine 18. Additionally, the front wheels 14A, 14B may be configured as caster wheels which, when combined with the independently drivable rear wheels 12A, 12B, may enable stand-on debris blower 10 to operate with zero turn radius maneuverability. However, it is to be understood that rear wheels 12A, 12B and/or front wheels 14A, 14B may be configured in any appropriate manner, and are not limited to the configuration described above.

Stand-on debris blower 10 may further include a main frame 16, with rear wheels 12A, 12B and front wheels 14A, 14B coupled to main frame 16. Also extending from main frame 16 is a control pedestal 20, as well as an operator platform 24. Operator platform 24 is provided proximate rear wheels 12A, 12B, thereby enabling the operator to stand upon debris blower 10 during use. Control pedestal 20 is situated forward and above operator platform 24, providing the operator with easy access to a variety of user controls 22. In some embodiments, a pad 23 may further be provided on a vertically-extending surface of the control pedestal 20, giving the operator a protected and/or comfortable surface upon which to lean during operation of stand-on debris blower 10.

Some user controls 22 allow the operator to steer and control speed/direction of the debris blower 10. Additionally, while not shown, other user controls may be provided on the control pedestal 20 to enable the operator to control the opening and closing of various deflectors within a blower assembly, as will be described in further detail below. These user controls may be in the form of, e.g., one or more control levers. Additionally and/or alternatively, in lieu of hand-operated control levers, the deflector(s) within the blower assembly may be operated by, e.g., one or more foot pedals, one or more knee-actuated pedals, etc.

As described above, the stand-on debris blower 10 may include a power source in the form of an internal combustion engine 18. More specifically, internal combustion engine 18 may be configured as a vertical-shaft engine coupled to main frame 16, with the shaft coupled to the drive components of the rear wheels 12A, 12B via, e.g., one or more drive pulleys. A fuel tank 19 may be provided on or near internal combustion engine 18, and be fluidly coupled so as to allow for fuel delivery to internal combustion engine 18. However, while the power source illustrated in FIGS. 1-2 is shown as an internal combustion engine, it is to be understood that any appropriate alternative power source may also be utilized. For example, in some embodiments, the power source may be an electric motor coupled to one or more batteries, wherein the battery(s) may be rechargeable and/or removable. Like the internal combustion engine 18, the electric motor may have a vertically-oriented shaft configured to provide power to various components, including the rear wheels 12A, 12B and/or other implements. Furthermore, the placement of the electric motor and/or the one or more batteries may be optimized for ideal center-of-gravity of the unit, operator accessibility, aesthetics, etc.

Referring still to FIGS. 1-2, a blower assembly 30 is shown in a horizontally-oriented position below main frame 16, substantially between the rear wheels 12A, 12B and the front wheels 14A, 14B. As will be described in further detail below, the blower assembly 30 includes a blower housing and an impeller which, when rotated by the power source, provides a high-volume, high-speed stream of air (e.g., between 4000-9000 cfm) for use in debris removal. In the configuration shown in FIGS. 1-2, blower assembly 30 is provided with a pair of air side discharge chutes: a left side discharge chute 32 and a right side discharge chute 34. Again, as will be described in further detail below, the blower assembly 30 may include one or more deflector assemblies in order to divert air flow to the left side discharge chute 32 or the right side discharge chute 34, dependent upon the operator's desired direction of air flow. Furthermore, while not shown in FIGS. 1-2, one or more additional side discharge chutes (e.g., a front-directed side discharge chute) may be provided. Also, in accordance with other aspects of the disclosure, the one or more deflector assemblies provided within the blower assembly 30 may be controlled so as to block air flow from being emitted from any of the side discharge chutes.

As noted above, the blower assembly 30 is horizontally-oriented below main frame 16. In such a configuration, the impeller within the blower assembly 30 rotates about a vertically-oriented axis. In some embodiments, the impeller of the blower assembly 30 may be directly coupled to the vertical shaft extending from the power source (i.e., internal combustion engine 18), thereby providing a simplified interface between the power source and the blower assembly 30. However, in other embodiments, the impeller of the blower assembly 30 may be coupled to the power source via, e.g., one or more pulleys, a clutch, etc. In this way, the impeller of the blower assembly 30 need not necessarily be aligned with the vertical shaft of the power source. Furthermore, if a clutch is used, the impeller of the blower assembly 30 may be disengaged from the rotating shaft of the power source, thereby allowing the power source to continue to operate without forcing air from the blower assembly 30.

Also, while blower assembly 30 is shown as being horizontally-oriented below main frame 16 (i.e., in a position similar to that of a mower deck on a stand-on lawnmower), it is to be understood that blower assembly 30 is not limited as such, and may instead be oriented above main frame 16. Blower assembly 30 may be affixed to the main frame 16, suspended from main frame 16, or formed as part of main frame 16. Furthermore, in some embodiments, the power source (e.g., internal combustion engine 18) may be supported by a top surface of blower assembly 30, as opposed to being supported by main frame 16. Additionally and/or alternatively, the blower assembly 30 may be movable vertically and/or angularly adjustable relative to main frame 16, thereby allowing for customization of the height and/or angle of the respective side discharge chutes with respect to the surface to be cleaned.

Figure 3:
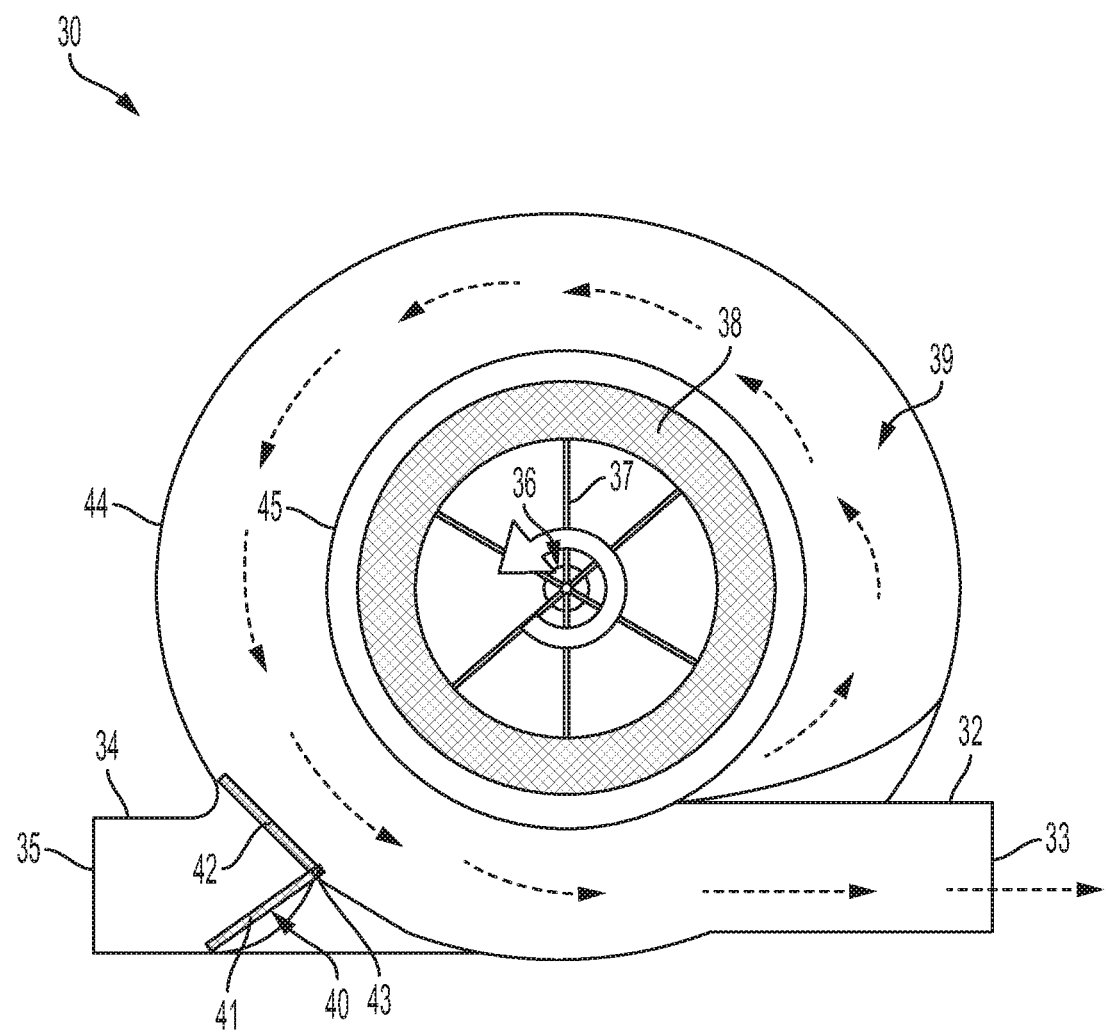
FIG. 3 is a cross-sectional view of a blower assembly in a first configuration in accordance with an aspect of the disclosure.
Figure 4:
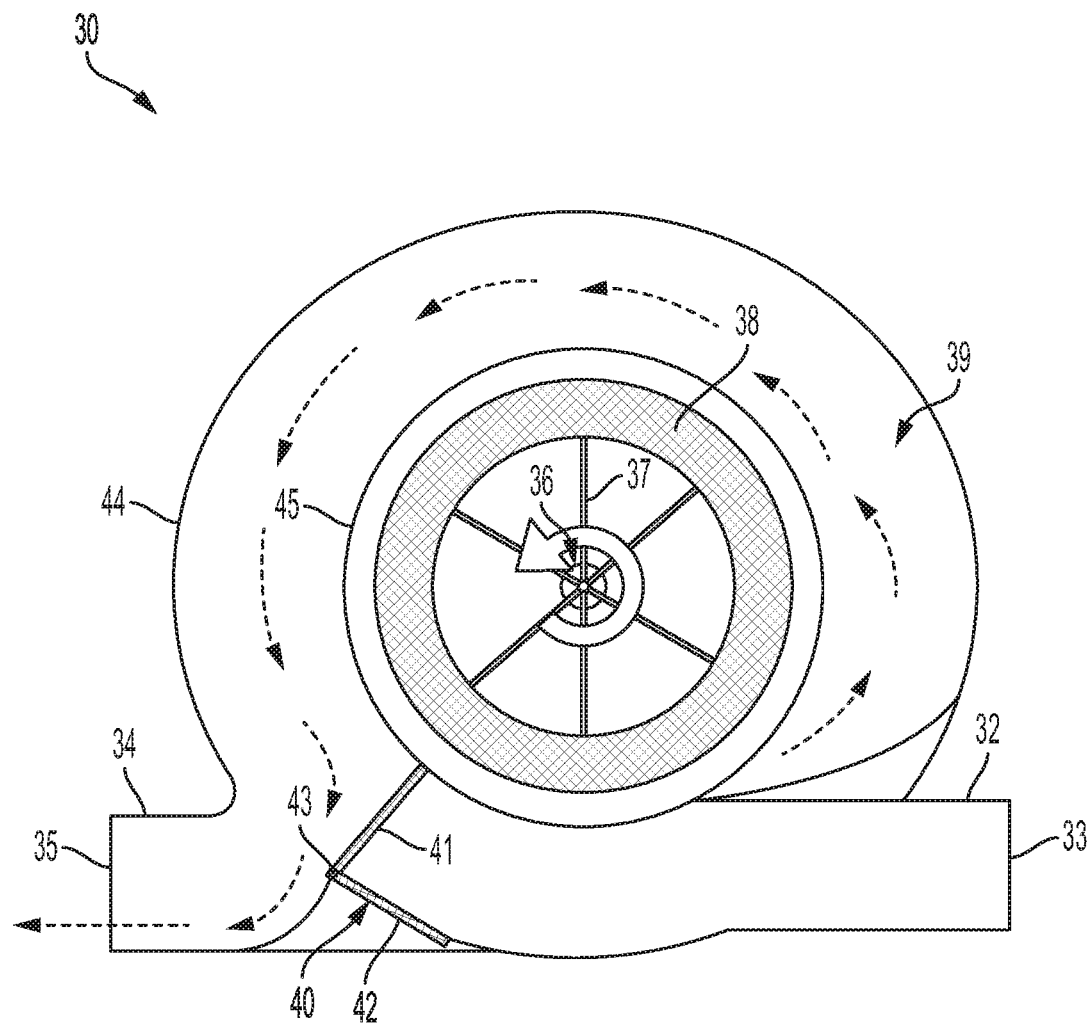
FIG. 4 is a cross-sectional view of the blower assembly of FIG. 3 in a second configuration.
Figure 5:
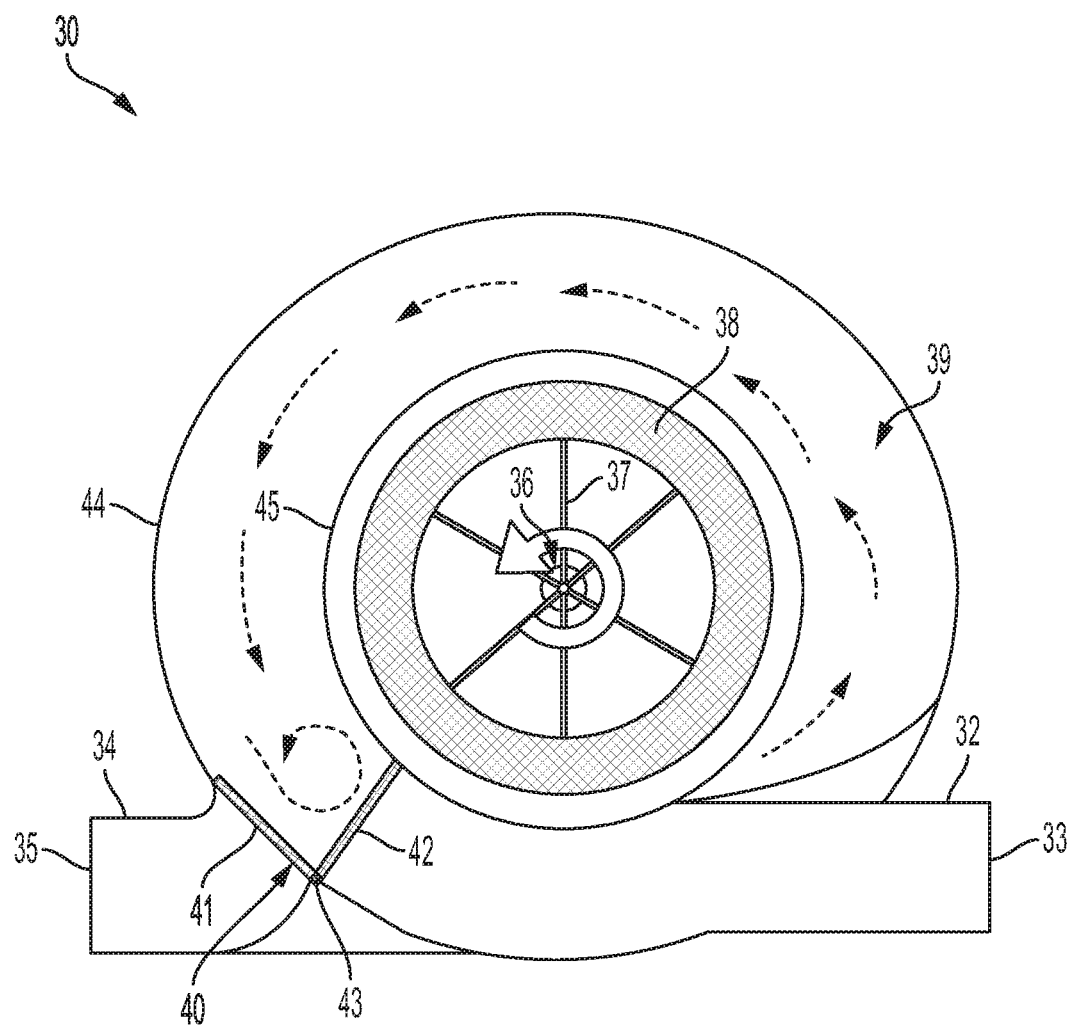
FIG. 5 is a cross-sectional view of the blower assembly of FIG. 3 in a third configuration.

Next, referring to FIGS. 3-5, a cross-sectional view of blower assembly 30 in accordance with aspects of the disclosure is shown. It is to be understood that the size, spacing, and/or orientation of the various features of blower assembly 30 are not to scale and are merely for illustrative purposes. As noted above, the blower assembly 30 includes an impeller 36 having a plurality of impeller blades 37 which, when rotated by the power source (e.g., internal combustion engine 18), generate a stream of air that is delivered through the blower assembly 30 and out of one of left side discharge chute 32 or right side discharge chute 34. More specifically, blower assembly 30 includes an annular channel 39 bounded by an outer wall 44 and an inner wall 45. As impeller 36 rotates, external air is drawn through one or more air inlet openings 38 and forced, by way of the impeller blades 37, through the annular channel 39. In some embodiments, the air inlet openings 38 are located on an upper surface of blower assembly 30, thereby drawing in air from above the blower assembly 30. In this way, the air drawn into the air inlet openings 38 generally includes less debris than air that might be located below the blower assembly 30 (i.e., near the ground or other surface to be cleaned). However, it is to be understood that air inlet openings 38 may also be provided on a lower surface of the blower assembly 30.

In the configuration shown in FIG. 3, the blower assembly 30 is configured such that air flow generated by impeller 36 passes through annular channel 39 and out of an opening 33 of left side discharge chute 32, thereby bypassing right side discharge chute 34. In previous blower assembly configurations, configuring the blower assembly such that air bypassed a first side discharge chute and exited a second side discharge chute (and vice versa) required user control of at least two separate deflectors, one to block off the first side discharge chute and the other to open the second side discharge chute. However, in accordance with the present disclosure, the bypass of right side discharge chute 34 and opening of left side discharge chute 32 is made possible by a single, substantially V-shaped deflector assembly 40, as will be described in further detail below.

As shown in FIGS. 3-5, V-shaped deflector assembly 40 includes a first leg 41 and a second leg 42, with the junction between first leg 41 and second leg 42 including a pivot axis 43. The size, lengths, and/or dimensions of first leg 41 and second leg 42 are dependent upon the internal dimensions of the blower assembly 30, as each of first leg 41 and second leg 42 must be appropriately sized so as to adequately block the flow of air through both annular channel 39 and right side discharge chute 34. For example, in the configuration shown in FIG. 3, V-shaped deflector assembly 40 is positioned such that second leg 42 blocks the flow of air through right side discharge chute 34, thereby allowing air to pass through left side discharge chute 32. In this scenario, first leg 41 is in a substantially passive position, as it is not blocking the flow of air through any chutes or channels. However, in some embodiments, first leg 41 and/or second leg 42 may contact a wall of a chute or channel (e.g., an inner wall of right side discharge chute 34 and/or outer wall 44) so as to act as a positioning stop for the V-shaped deflector assembly 40 in a chosen configuration.

Referring now to FIG. 4, blower assembly 30 is shown in an alternative configuration, wherein air is directed through an outlet opening 35 of right side discharge chute 34 and blocked from exiting left side chute 32. In this configuration, the V-shaped deflector assembly 40 is simply rotated about pivot axis 43 until first leg 41 substantially blocks the flow of air through annular channel 39 toward left side chute 32, instead directing air through right side chute 34. Unlike the configuration described above with respect to FIG. 3, second leg 42 in the position shown in FIG. 4 is in a substantially passive position, as it is not blocking the flow of air through any chutes or channels. However, in some embodiments, first leg 41 and/or second leg 42 may contact a wall of a chute or channel (e.g., inner wall 45 and/or outer wall 44, respectively) so as to act as a positioning stop for the V-shaped deflector assembly 40 in a chosen configuration.

Next, referring to FIG. 5, blower assembly 30 is shown a third configuration, wherein air is substantially prevented from exiting either left side chute 32 or right side chute 34. In this third configuration, the V-shaped deflector assembly 40 is rotated about pivot axis 43 until first leg 41 substantially blocks the flow of air to right side chute 34, while second leg 42 is positioned such that air passing through annular channel 39 is substantially blocked from reaching left side chute 32. Accordingly, in the position shown in FIG. 5, V-shaped deflector assembly 40 enables the impeller 36 to rotate and generate air flow, while preventing the produced stream of air from being emitted from either the left side chute 32 or the right side chute 34. Such a configuration may be desirable when an operator wishes to transport the debris blower (e.g., stand-on debris blower 10) from one location to another without causing debris movement, yet still allowing the power source (e.g., internal combustion engine 18) to function at or near full speed so as to power the drive wheels of the unit.

Furthermore, V-shaped deflector assembly 40 allows for the three separate configurations shown and described in FIGS. 3-5 in one unified deflector assembly, thereby greatly simplifying the mechanical componentry and control strategies needed to alter air flow from blower assembly 30. As noted above, previous blower assemblies have required at least two separate deflector assemblies to divert and/or block air flow from exiting the various discharge chutes. Thus, with multiple separate deflector assemblies comes multiple separate control levers and multiple separate mechanical and/or electric actuators capable of moving the deflectors. With the V-shaped deflector assembly 40 in accordance with the present disclosure, a single control lever and a single mechanical and/or electrical actuator could be utilized to change the positions between left side discharge, right side discharge, and no discharge, thereby simplifying operation and maintenance, as well as reducing costs.

While not shown in FIGS. 3-5, it is to be understood that movement of the V-shaped deflector assembly 40 may be controlled by one or more of a mechanical interface (e.g., a direct or indirect mechanical linkage from an operator control panel to the pivot axis 43), an electrical interface (e.g., an electric motor configured to rotate the assembly 40 about pivot axis 43 and controllable via a user-control lever), or any other suitable actuator configuration. In some embodiments, the V-shaped deflector 40 is biased so as to be maintained in the "closed" configuration shown and described above with respect to FIG. 5. V-shaped deflector 40 may be held in this "closed" position through any appropriate means, such as, e.g., a biasing spring, an electric motor, a solenoid actuator, one or more magnets, a physical notch or detent on the control lever/handle coupled to the V-shaped deflector 40, etc. Furthermore, while the use of one or more interior walls as "stops" for both the left-side emission of air (FIG. 3) and right-side emission of air (FIG. 4) is described above, it is to be understood that in some embodiments, one or more of, e.g., a biasing spring, an electric motor, a solenoid actuator, one or more magnets, a physical notch or detent on the control lever/handle coupled to the V-shaped deflector 40, or another means may be utilized to hold V-shaped deflector 40 in the left-side and/or right-side "open" position.

Furthermore, while also not shown in FIGS. 3-5, it is also to be understood that one or both of left side chute 32 and right side chute 34 may include one or more stationary deflectors disposed therein. The stationary deflectors, which may be welded or otherwise affixed to one or more interior walls of the respective chutes, may be utilized to direct the flow of air as it exits a respective outlet. For example, it may be desirable to direct the air in a slightly downward direction as it exits the chute so as to lift debris from the surface to be cleaned. Accordingly, one or more stationary deflectors may be positioned on an upper interior wall of each respective chute so as to provide such a "lifting" feature without the need for additional movable (and controllable) deflectors.

Additionally and/or alternatively, while FIGS. 3-5 show impeller 36 rotating in a counter-clockwise direction, thereby forcing air through annular channel 39 in a similarly counter-clockwise direction, it is to be understood that blower assembly 30 may be configured such that impeller 36 is instead rotated in a clockwise direction. In such a configuration, V-shaped deflector 40 may be positioned proximate left side discharge chute 32 (as opposed to right side discharge chute 34, as shown in FIGS. 3-5). Thus, it is to be understood that the position of V-shaped deflector 40 may be altered based on the direction of airflow through blower assembly 39, but the effect of V-shaped deflector 40 in selectively blocking the right side discharge chute, the left side discharge chute, or both side discharge chutes does not change.

Figure 6:
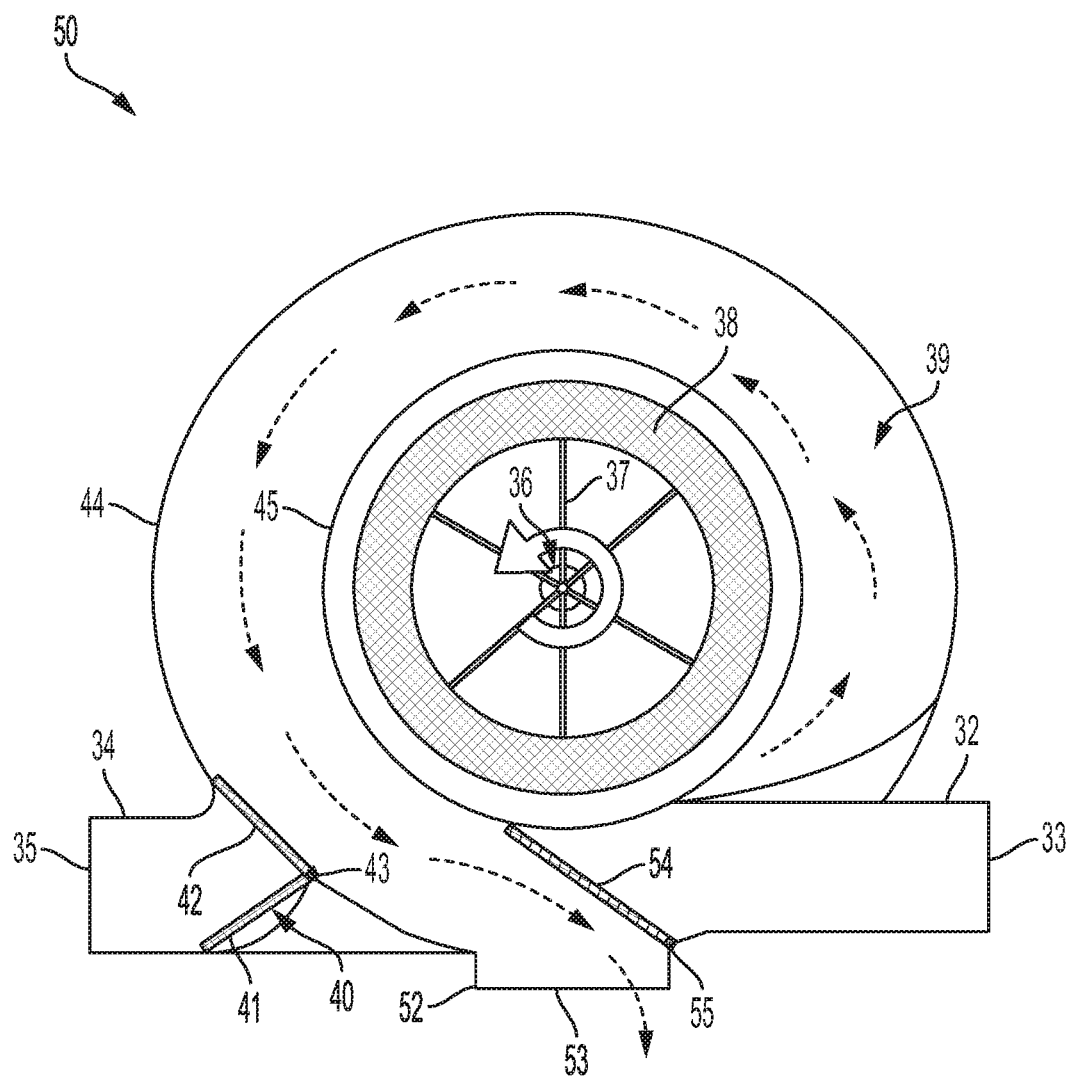
FIG. 6 is a cross-sectional view of a blower assembly in accordance with another aspect of the disclosure.

Next, referring to FIG. 6, a blower assembly 50 in accordance with another aspect of the disclosure is shown. Blower assembly 50 shares many features in common with blower assembly 30 described above with respect to FIGS. 3-5. Accordingly, for clarity, common features and functions between blower assembly 30 and blower assembly 50 will not be reiterated herein. However, unlike blower assembly 30, blower assembly 50 includes a third discharge outlet in the form of a front side discharge chute 52 which, when positioned on a debris blower such as stand-on debris blower 10, would be configured to blow air forward, as opposed to one of the right or left sides. Alternatively, if blower assembly 50 were to be configured for use was a vertically-oriented assembly (similar to that which is shown and described in U.S. Pat. No. 7,841,044 B1, which is incorporated herein by reference), the front side discharge chute 52 may be oriented and/or configured such that air is blown in a direction substantially parallel to the rotational axis of impeller 36. In this way, the air blown from discharge chute 52 is blown forward of (and not under) the stand-on debris blower, regardless of whether the blower assembly 50 is a horizontally-oriented assembly (as shown in FIG. 6) or a vertically-oriented assembly.

In the configuration shown in FIG. 6, blower assembly 50 is in the "forward" blowing arrangement. That is, V-shaped deflector assembly 40 is positioned such that air is prevented from flowing to right side discharge chute 34, such as that described above with respect to FIG. 3. However, blower assembly 50 includes a second deflector assembly 54 proximate the front side discharge chute 52, which is configured to pivot about a pivot axis 55. In the position shown in FIG. 6, deflector assembly 54 is controlled so as to block the flow of air through annular channel 39 to left side discharge chute 32, thereby diverting air out of front outlet opening 53. Accordingly, to control air flow through three separate side discharge chutes, blower assembly 50 utilizes two deflector assemblies. However, even though a single deflector assembly (i.e., V-shaped deflector assembly 40) may not be sufficient to control flow through all chutes in the configuration shown in FIG. 6, the cost and complexity of blower assembly 50 is still reduced as compared to existing three-chute blower assemblies, which require three respective deflector assemblies (and associated controls). Furthermore, when placed in the configuration shown and described above with respect to FIG. 5, V-shaped deflector assembly 40 still enables air flow to be blocked to all chutes, even in the three-chute configuration shown in FIG. 6. In this way, biasing of the V-shaped deflector assembly 40 to the "closed" position is still effective in preventing airflow from any and all chutes during, e.g., transport.

Figure 7:
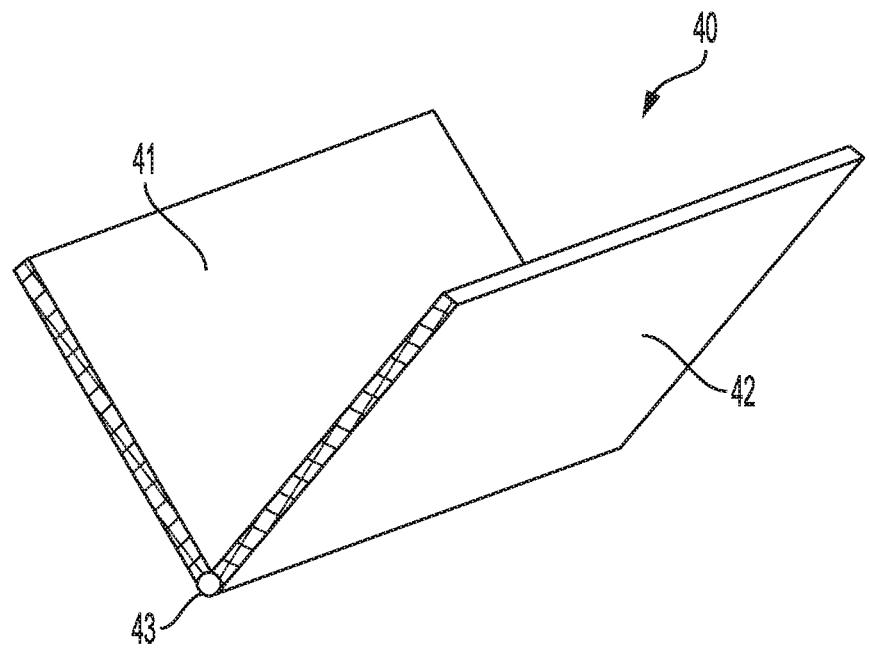
FIG. 7 is a perspective view of a V-shaped deflector assembly in accordance with an aspect of the disclosure.

Referring now to FIG. 7, a more detailed view of V-shaped deflector assembly 40 in accordance with an aspect of the disclosure is shown. As described above, V-shaped deflector assembly 40 includes a first leg 41 and a second leg 42, with the junction between first leg 41 and second leg 42 including a pivot axis 43. The size, lengths, and/or dimensions of first leg 41 and second leg 42 may be dependent upon the internal dimensions of the blower assembly, as each of first leg 41 and second leg 42 should be appropriately sized so as to adequately block the flow of air through both annular channel 39 and right side discharge chute 34. Accordingly, first leg 41 and second leg 42 need not be symmetrical to one another, as their lengths and shapes may vary. V-shaped deflector assembly 40 may be made of any appropriate high-strength material, such as e.g., steel, aluminum, plastic, and may be manufactured through any appropriate process such as, e.g., stamping, forming, welding, molding, etc.

Figure 8:
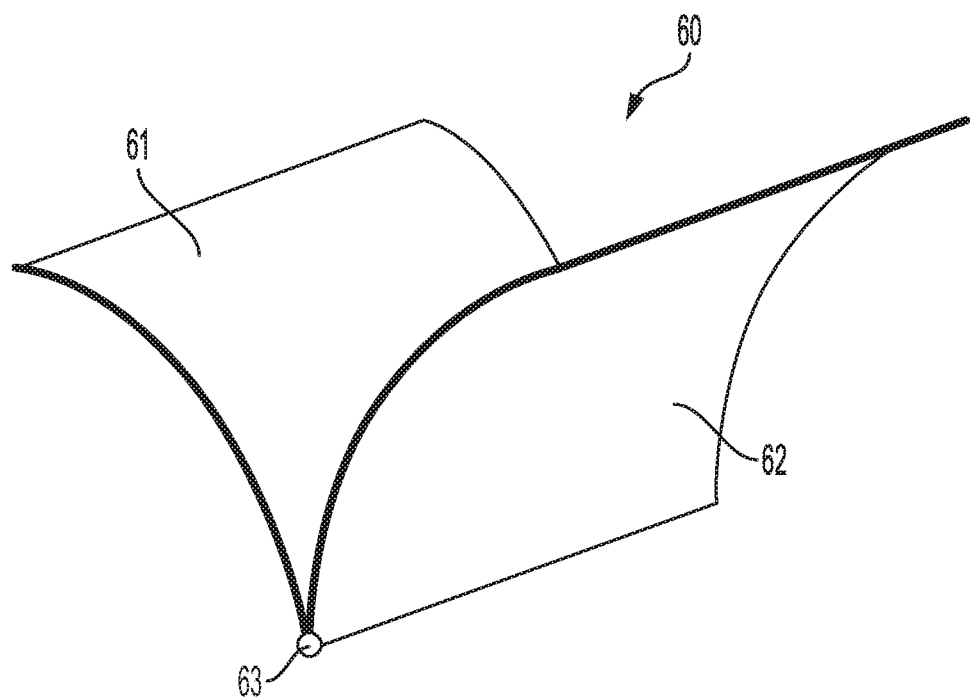
FIG. 8 is a perspective view of a V-shaped deflector assembly in accordance with another aspect of the disclosure.

Turning to FIG. 8, a V-shaped deflector assembly 60 in accordance with another aspect of the disclosure is shown. Similar to V-shaped deflector assembly 40, V-shaped deflector assembly 60 includes a first leg 61 and a second leg 62, with the junction between first leg 61 and second leg 62 including a pivot axis 63. However, each of first leg 61 and second leg 62 are curved in opposite directions, unlike the substantially straight legs of V-shaped deflector assembly 40 shown in FIG. 7. With this configuration, each respective leg 61, 62 of V-shaped deflector assembly 60 may better align with the curvature of the interior walls of the annular channel within the blower assembly, thereby providing for a less turbulent air flow as the air passes the V-shaped deflector assembly 60 in the direction of the selected side discharge chute. The size, lengths, and/or dimensions of first leg 61 and second leg 62 may be dependent upon the internal dimensions of the blower assembly, as each of first leg 61 and second leg 62 should be appropriately sized so as to adequately block the flow of air through the respective channels/chutes. Accordingly, first leg 61 and second leg 62 need not be symmetrical to one another, as their lengths and shapes may vary. V-shaped deflector assembly 60 may be made of any appropriate high-strength material, such as e.g., steel, aluminum, plastic, and may be manufactured through any appropriate process such as, e.g., stamping, forming, welding, molding, etc.

Figure 9:
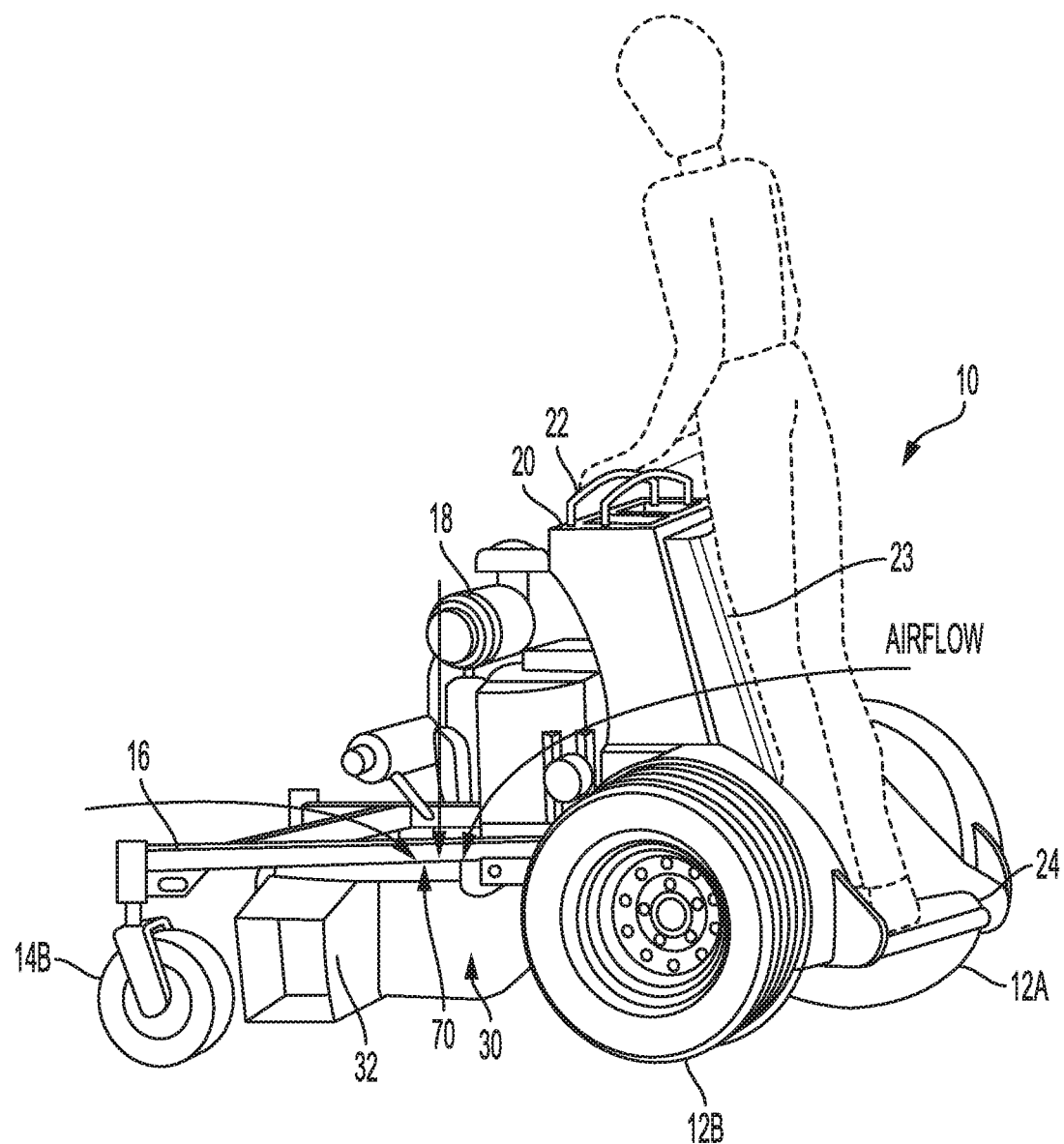
FIG. 9 is a side perspective view of a plurality of intake airflow directions for the stand-on debris blower of FIG. 1.

Next, referring to FIG. 9, intake airflow for stand-on debris blower 10 in accordance with another aspect of the disclosure is shown. As noted above with respect to FIGS. 1-2, the blower assembly 30 may be mounted horizontally with respect to frame 16. Thus, as is shown in FIG. 9, a primary airflow intake 70 may be positioned such that intake air (i.e., air drawn through air intake openings 38 by impeller 36 shown and described with respect to FIGS. 3-6) is primarily drawn from one or more regions above the blower assembly 30. As illustrated in FIG. 9, this airflow may be drawn from regions substantially in front of the debris blower 10, behind the debris blower 10, and/or directly above the debris blower 10. However, it is to be understood that the illustrated airflow directions are not to be considered limiting, and air may be drawn into the primary airflow intake 70 from one or more other directions.

By drawing air into primary airflow intake 70 from region(s) substantially above blower assembly 30, the entry of dust, debris, and/or other contaminants into the primary airflow intake 70 may be minimized, thereby substantially preventing or reducing the accumulation of such contaminants on the impeller 36. Furthermore, as the power source (e.g., internal combustion engine 18) used to drive the impeller 36 may be positioned substantially above the horizontally-mounted blower assembly 30, air drawn into primary airflow intake 70 may naturally flow over, through, and/or around at least some portion of the power source. In this way, the intake air to be used for debris removal may also serve to cool one or more components of the power source during operation of the stand-on debris blower 10.

While FIGS. 1, 2, and 9 illustrate a stand-on debris blower, it is to be understood that the features described herein are not limited to use on stand-on outdoor power equipment and may also be applicable to other types of debris blowers, such as, e.g., walk-behind debris blowers, ride-on debris blowers, tow-behind debris blowers, etc. Furthermore, the V-shaped deflector assemblies described with respect to FIGS. 3-8 is not limited to use within a horizontally-oriented blower assembly driven by a vertical shaft power source. That is, the V-shaped deflector assemblies described herein may be applicable for use in vertically-oriented blower assemblies such as those shown and described in U.S. Pat. No. 7,841,044 B1, the disclosure of which is incorporated herein by reference.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A stand-on debris blower comprising:
a main frame;
a pair of front wheels;
a pair of rear wheels;
an operator standing platform coupled to the main frame;
a control pedestal positioned forward of and above the operator standing platform;
a power source, wherein the power source comprises a vertically-oriented shaft; and
a blower assembly, wherein the blower assembly comprises a horizontally-oriented impeller configured to rotate about a vertical axis, the horizontally-oriented impeller being coupled to the vertically-oriented shaft of the power source.

2. The stand-on debris blower of claim 1, wherein the power source is one of an internal combustion engine and a battery-powered electric motor.

3. The stand-on debris blower of claim 1, wherein the blower assembly is positioned below the main frame, and further wherein the blower assembly is positioned at least partially between the pair of front wheels and the pair of rear wheels.

4. The stand-on debris blower of claim 1, wherein the blower assembly is positioned above the main frame.

5. The stand-on debris blower of claim 1, wherein the blower assembly comprises a primary airflow intake configured to enable the horizontally-oriented impeller to draw air from one or more regions above the blower assembly.

6. The stand-on debris blower of claim 5, wherein the primary airflow intake is positioned proximate the power source such that air drawn into the primary airflow intake acts to cool at least a portion of the power source.

7. The stand-on debris blower of claim 1, wherein the blower assembly comprises at least a first side discharge chute and a second side discharge chute opposite the first side discharge chute.

8. The stand-on debris blower of claim 7, further comprising a V-shaped deflector assembly positioned proximate the first side discharge chute within the blower assembly, wherein the V-shaped deflector assembly is configurable to block air flow from the first side discharge chute in a first position, the second side discharge chute in a second position, and both the first side discharge chute and the second side discharge chute in a third position.

9. The stand-on debris blower of claim 8, wherein the V-shaped deflector is biased to be held in the third position until moved to another position by an operator.

10. The stand-on debris blower of claim 8, wherein the position of the V-shaped deflector is controlled by one or more of a biasing spring, an electric motor, a solenoid actuator, one or more magnets, or a physical detent on a control handle mechanically coupled to the V-shaped deflector.

11. The stand-on debris blower of claim 1, wherein the blower assembly comprises a first side discharge chute, a second side discharge chute opposite the first side discharge chute, and a front discharge chute.

12. A debris blower comprising:
a power source, wherein the power source comprises a vertically-oriented shaft; and
a blower assembly, wherein the blower assembly comprises a horizontally-oriented impeller configured to rotate about a vertical axis, the horizontally-oriented impeller being coupled to the vertically-oriented shaft of the power source.

13. The debris blower of claim 12, wherein the horizontally-oriented impeller is directly coupled to the vertically-oriented shaft of the power source.

14. The debris blower of claim 12, wherein the horizontally-oriented impeller is indirectly coupled to the vertically-oriented shaft of the power source by way of a clutch mechanism.

15. The debris blower of claim 12, wherein the power source is one of an internal combustion engine and an electric motor.

16. The debris blower of claim 12, wherein the debris blower is one of a stand-on unit, a walk-behind unit, a ride-on unit, and a tow-behind unit.

17. A blower assembly for use with a debris blower unit, the blower assembly comprising:
- a blower housing;
- an annular channel formed within the blower housing;
- an impeller rotatable within the blower housing and configured to force a stream of air through the annular channel;
- a first side discharge chute;
- a second side discharge chute; and
- a V-shaped deflector assembly, wherein the V-shaped deflector assembly is positioned within the blower housing proximate the first side discharge chute.

18. The blower assembly of claim 17, the V-shaped deflector assembly is configurable to block air flow from the first side discharge chute in a first position, the second side discharge chute in a second position, and both the first side discharge chute and the second side discharge chute in a third position.

19. The blower assembly of claim 17, further comprising a front discharge chute.

20. The blower assembly of claim 17, wherein the blower housing is configured to be horizontally-oriented such that the impeller is rotatable about a vertical axis.

* * * * *